(12) United States Patent
Pys

(10) Patent No.: US 9,992,820 B2
(45) Date of Patent: Jun. 5, 2018

(54) VEHICLE GLASS REMOVAL SYSTEM AND METHOD

(71) Applicant: Cornelis Christianus Pys, Victoria (CA)

(72) Inventor: Cornelis Christianus Pys, Victoria (CA)

( * ) Notice: Subject to any disclaimer, the term of this patent is extended or adjusted under 35 U.S.C. 154(b) by 692 days.

(21) Appl. No.: 13/750,247

(22) Filed: Jan. 25, 2013

(65) Prior Publication Data

US 2013/0233842 A1    Sep. 12, 2013

Related U.S. Application Data

(60) Provisional application No. 61/609,697, filed on Mar. 12, 2012.

(51) Int. Cl.
*H05B 1/00* (2006.01)
*B60J 10/70* (2016.01)

(52) U.S. Cl.
CPC ............... *H05B 1/00* (2013.01); *B60J 10/70* (2016.02)

(58) Field of Classification Search
CPC ...... H05B 3/84; H05B 1/00; H05B 2203/008; H05B 2203/016; H01R 43/00; H01C 17/06; Y10T 29/49204; Y10T 29/49099; Y10T 29/49083; B60J 10/70
USPC ........................................................ 219/203
See application file for complete search history.

(56) References Cited

U.S. PATENT DOCUMENTS

| | | | | | |
|---|---|---|---|---|---|
| 127,270 | A | * | 5/1872 | Robinson | B23K 3/0315 144/336 |
| 168,801 | A | * | 10/1875 | Stevens | B26D 3/006 30/116 |
| 854,930 | A | * | 5/1907 | Crane et al. | B29C 51/32 30/116 |
| 1,155,835 | A | * | 10/1915 | Murphy | B26D 3/006 30/140 |
| 1,200,810 | A | * | 10/1916 | Clemens | B23K 3/0307 219/230 |
| 1,550,878 | A | * | 8/1925 | Charleston | B23K 3/0307 219/233 |
| 1,836,396 | A | * | 12/1931 | Ridgely | B26D 1/205 164/77 |
| 2,004,580 | A | * | 6/1935 | Meyer | B27M 1/06 219/230 |

(Continued)

*Primary Examiner* — Eric Stapleton
(74) *Attorney, Agent, or Firm* — Global Intellectual Poperty Agency, LLC; Jordan Sworen

(57) ABSTRACT

A vehicle glass removal system and method using a heating element and thermoplastic adhesive is disclosed, whereby a resistance heating element is deployed along the bond line between a vehicle glass member and its supporting vehicle frame. The system accepts user input and activates the heating element, causing the adhesive along the bond line to weaken, thereby reducing or completely eliminating the need for a cutting operation when separating the glass from the frame. Two embodiments are contemplated for the deployment of the heating element: embedded within the perimeter of the glass member, or preferably deployed along the vehicle window frame. The system includes safety precautions that prevent the heating element from operating while the vehicle is in operation, including authenticated access and communication with the vehicle electrical system to recognize the state of the vehicle.

7 Claims, 4 Drawing Sheets

(56) References Cited

U.S. PATENT DOCUMENTS

| | | | | |
|---|---|---|---|---|
| 2,240,382 A | * | 4/1941 | Van Alstine | B29D 30/68 157/13 |
| 2,471,019 A | * | 5/1949 | Baker | A45D 26/0009 132/212 |
| 2,477,887 A | * | 8/1949 | McMillan | B23K 3/0307 219/234 |
| 2,674,005 A | * | 4/1954 | Simon | E04F 21/32 15/105 |
| 2,746,452 A | * | 5/1956 | Saylors | A61F 15/02 30/1 |
| 2,896,322 A | * | 7/1959 | Vose | B23D 21/06 30/168 |
| 3,553,833 A | * | 1/1971 | Jochim et al. | H05B 3/84 219/203 |
| 3,673,383 A | * | 6/1972 | Sofia | B23D 79/06 15/236.01 |
| 3,711,677 A | * | 1/1973 | Cummins | H05B 3/00 219/221 |
| 3,749,885 A | * | 7/1973 | Nagasima | B60S 1/586 200/61.05 |
| 3,924,327 A | * | 12/1975 | Edwards | B25B 27/0035 30/277 |
| 3,985,996 A | * | 10/1976 | Fischer | B26D 3/006 219/221 |
| 4,080,734 A | * | 3/1978 | Barbour | B25B 27/0035 29/275 |
| 4,155,090 A | * | 5/1979 | Kuroyanagi | H05B 3/84 343/704 |
| 4,215,475 A | * | 8/1980 | Morford | B26D 7/086 30/220 |
| 4,315,450 A | * | 2/1982 | Pray | B26D 3/065 83/56 |
| 4,395,825 A | * | 8/1983 | Lock | B25D 17/02 29/275 |
| 4,417,398 A | * | 11/1983 | Steck | B25B 27/0035 29/278 |
| 4,452,316 A | * | 6/1984 | Edwards | A01B 1/065 172/41 |
| 4,481,059 A | * | 11/1984 | Steck | B25B 27/0035 156/254 |
| 4,511,318 A | * | 4/1985 | Kolodesh | A21C 7/04 156/243 |
| 4,543,720 A | * | 10/1985 | Grunikiewicz | B26B 7/00 29/239 |
| 4,694,576 A | * | 9/1987 | Cothery | B26B 27/00 30/280 |
| 4,819,531 A | * | 4/1989 | Lawhon | B62D 65/06 30/277.4 |
| 5,016,500 A | * | 5/1991 | Conrad | H02G 1/1278 219/233 |
| 5,268,183 A | * | 12/1993 | Garza | B29C 33/0072 264/252 |
| 5,352,111 A | * | 10/1994 | Selbak | A21B 3/132 425/350 |
| D359,209 S | * | 6/1995 | Carey | B26B 27/002 D8/20 |
| 5,479,689 A | * | 1/1996 | Schmit | B25B 27/00 29/239 |
| 5,622,093 A | * | 4/1997 | Hutchins | B26B 27/002 29/281.1 |
| 5,784,788 A | * | 7/1998 | Cothery | B26B 5/00 279/79 |
| 5,826,342 A | * | 10/1998 | Zuro | B26B 3/00 30/279.2 |
| 5,886,321 A | * | 3/1999 | Pinchok, Jr. | B32B 17/10036 219/203 |
| 5,895,589 A | * | 4/1999 | Rogers | B23K 26/4065 156/713 |
| 6,002,373 A | * | 12/1999 | Taniguchi | H01Q 1/1278 343/704 |
| 6,130,645 A | * | 10/2000 | Lindenmeier | H01Q 1/1278 343/704 |
| D438,766 S | * | 3/2001 | Lock | B26B 27/002 D8/20 |
| 6,231,332 B1 | * | 5/2001 | Suzuki | A21C 11/006 425/364 R |
| 6,256,889 B1 | * | 7/2001 | Zuro | B26B 5/00 30/314 |
| 6,280,784 B1 | * | 8/2001 | Yang | A21C 11/163 425/112 |
| 6,591,502 B1 | * | 7/2003 | Gmeilbauer | B26B 27/002 30/116 |
| 6,616,800 B2 | * | 9/2003 | Eriksson | B26B 27/002 156/714 |
| 6,914,224 B2 | * | 7/2005 | Gillner | B32B 17/10036 219/202 |
| 7,308,763 B2 | * | 12/2007 | Glodowski | B26B 5/00 30/294 |
| 7,596,871 B1 | * | 10/2009 | Nilsson | B25G 3/02 30/329 |
| 7,716,841 B2 | * | 5/2010 | Kang | B25F 1/02 30/294 |
| 7,731,373 B2 | * | 6/2010 | Oskarsson | B60S 1/026 219/203 |
| 8,099,869 B2 | * | 1/2012 | Hess | B26B 27/002 30/116 |
| 8,151,470 B2 | * | 4/2012 | Hallman | A47L 13/02 30/167 |
| 8,431,867 B2 | * | 4/2013 | Blanchard | B32B 17/10036 219/203 |
| 2003/0068398 A1 | * | 4/2003 | Chandler | A21C 9/085 425/208 |
| 2004/0078984 A1 | * | 4/2004 | Glodowski | B26B 5/00 30/298 |
| 2005/0140176 A1 | * | 6/2005 | Hampel | B62D 29/043 296/190.08 |
| 2006/0175762 A1 | * | 8/2006 | Barnett | B60J 1/1853 277/551 |
| 2010/0270280 A1 | * | 10/2010 | Blanchard | B32B 17/10036 219/203 |

\* cited by examiner ated patent application is herein incorporated by reference in its entirety to provide continuity of disclosure.

VEHICLE GLASS REMOVAL SYSTEM AND METHOD

CROSS REFERENCE TO RELATED APPLICATION

This application claims the benefit of U.S. Provisional Application No. 61/609,697 filed on Mar. 12, 2012, entitled "Auto Glass Removal System." The above identified patent application is herein incorporated by reference in its entirety to provide continuity of disclosure.

BACKGROUND OF THE INVENTION

Field of the Invention

The present invention relates to removal of automotive glass from the frame of a vehicle. More specifically, the present invention pertains to a heating element system that facilitates the removal of automotive glass by heating the windshield securing compound to allow separation.

Automotive glass, and particularly the windshield of an automobile, is held in place by a strong adhesive layer and covered by molding pieces that present challenges for both do-it-yourself car owners and even professional technicians when replacing a defective glass that needs attention. The adhesive layer is a urethane or alternative epoxy adhesive that creates a secure seal between the window and the frame, while also allowing the window to expand and contract with temperature changes without introducing considerable structural loads into the window. The epoxy flexes with the changing geometry of the window, while still maintaining its secure seal and structural hold on the window during automotive operation.

The process of removing automotive glass is a time intensive and laborious process that requires technical skill and experience to master. First the window edge is prepared by removing any molding and trim pieces that surround the window, and thereafter removing a rubber seal to reveal the underlying adhesive layer. Thereafter, removal of the window requires a cutting operation that separates the perimeter of the window from the adhesive layer thereunder. The adhesive layer is a tough material that resists ready separation. To begin the separation, a cutting tool is used to score the adhesive layer between the perimeter edge of the windshield and a pinch weld along the window frame structure. The cutting tool is worked around the perimeter of the window to slowly remove material and allow separation of the window from the adhesive or the adhesive from the window frame.

This process can lead to several problems, as the cutting tool is a sharp tool that is being heavily worked to remove the adhesive. During the cutting process, the tool can slash vehicle frame and its coated surfaces, leaving a potential rust source if not treated with primer before replacing the window. Further, the tight fitment of the window within the frame can introduce loads into the glass that can cause shattering of the glass, which is both dangerous and time consuming to clean thereafter. Finally, the installer himself can be at risk of injury because of the amount of work required on the cutting tool and the awkward working position of the technician during removal. Precautions must be followed to prevent cutting injuries.

To resolve these issues in the art, the present invention proposes new automotive glass removal system and method that does not require sole use of a cutting tool as a means of separation. The present invention contemplates a high temperature resistance heating element that is powered by the vehicle to soften the adhesive material and even melt the adhesive, whereafter a separation tool can lift and separate the glass from the window frame. The system is deployed such that a resistance heating element is present in the window perimeter, or alternatively along the window frame, and electrically connected to a controller that draws current from the vehicle battery, the vehicle electrical system, or a separate power supply outside of the vehicle. It is further contemplated that the system requires an authenticated user to operate, whereby a vehicle occupant or unassuming owner cannot accidentally initiate the system without proper access or authentication.

Description of the Prior Art

Devices have been disclosed in the prior art that relate to cutting tools and other methods for automotive glass removal, as well as automotive glass that has imbedded heating elements. These include those that have been patented and published in patent application publications, and generally relate to diverging structures or systems designed for a different application than currently contemplated. No system or method is present that describes the use of a high temperature heating element to assist with automotive glass removal, wherein the system is deployed on the vehicle by the manufacturer or by a third party vendor after initial purchase. The following is a list of devices deemed most relevant to the present disclosure, which are herein described for the purposes of highlighting and differentiating the unique aspects of the present invention, and further highlighting the drawbacks existing in the prior art.

U.S. Patent Application Publication No. 2010/0270280 to Blanchard discloses a transparent window pane having a heating coating thereon. The heating coating is connected to at least two electrical busbars of low electrical resistance. The busbars allow current to flow into the heating field formed by the coating on the window, whereby the window can be heated to reduce condensation and improve clarity thereof in certain driving situations. The Blanchard device, while disclosing heating elements and an automotive glass member, fails to define a system that is adapted for use when removing the glass from the vehicle.

Other devices relate to imbedded wires and antennas within automotive glass. U.S. Pat. No. 4,155,090 to Kuroyanagi discloses an automobile window glass having a pattern of thermal defogging wires therein, wherein the thermal defogging wires are empowered by a source of electrical power such as the vehicle battery or alternator. U.S. Pat. No. 6,130,645 to Lindenmeier discloses an antenna for transmitting and receiving signals in automotive glass comprising a heating field, an electrical ground, a high frequency connection, a transformer, and an AC generator for powering the system. Finally, U.S. Pat. No. 7,731,373 to Oskarsson discloses yet another electrically heated window assembly to be utilized in conjunction with a viewing camera. The heated window comprises a resistance heating element within the viewing area of the image device and having a plurality of sequential arc-shaped paths to improve clarity through the window.

The devices in the prior art largely relate to electrically heated windows for the purposes of defogging the window during driving operations, and also to window removal tools that assist in the cutting and separation of an automotive window from its surrounding adhesive. These articles have not been combined in the art or contemplated for use when replacing an automotive glass structure, but rather relate to distinct purposes that are divergent from that of the present disclosure. The present invention contemplates a high temperature heating element that assists in automotive glass removal, wherein a thermoplastic epoxy is heated to soften and melt its connection with the window perimeter. A technician can thereafter utilize basic hand tools for lifting and separating the window from the vehicle window frame without using excessive force in a cutting operation, which is currently required when removing a windshield or rear window from a vehicle.

The present invention contemplates a system and a method of improved automotive glass removal that improves efficiency of the process, reduces hazards to the vehicle and the technician, and further requires no special tools for liberating the glass from its vehicle frame. It is submitted that the present invention is substantially divergent in design elements from the prior art, and consequently it is clear that there is a need in the art for an improvement to existing automotive glass removal systems and methods. In this regard the instant invention substantially fulfills these needs.

SUMMARY OF THE INVENTION

In view of the foregoing disadvantages inherent in the known types of automotive glass removal tools now present in the prior art, the present invention provides a new method and system of removal wherein the same can be utilized for providing convenience for the user when separating automotive glass its support frame by heating the bonding adhesive around the glass perimeter before prying and replacing the glass.

It is therefore an object of the present invention to provide a new and improved automotive glass removal system and method that has all of the advantages of the prior art and none of the disadvantages.

It is another object of the present invention to provide an automotive glass removal system that facilitates removal of an automotive glass from a vehicle without the use of cutting tools, whereby the adhesive bonding material is softened using a heating element.

Another object of the present invention is to provide an automotive glass removal system that comprises a resistance heating element powered by the vehicle electrical system, whereby an authorized user can initiate and control the system when an article of automotive glass is being removed.

Yet another object of the present invention is to provide an automotive glass removal system that contemplates a new vehicle system having all components of the system imbedded within the vehicle, including the electrical power source, its control, and the heating element around the frame of an automotive window frame.

Another object of the present invention is to provide an automotive glass removal system that contemplates a new vehicle system that functions in combination with a specifically designed windshield or automotive glass structure having a heating element and electrical connection imbedded along its perimeter edge, whereby upon installation of the glass, the system has electrical connectivity to the heating element within the glass.

Still another object of the present invention is to provide an automotive glass removal system and method that replaces the current methods of glass removal and offers a safer and less strenuous operation that does not expose the vehicle or the installer to any risk of injury during the removal process.

A final object of the present invention is to provide an automotive glass removal system that can be installed within a vehicle as original equipment by the vehicle manufacturer, or subsequently installed by a third party as an accessories or modification to the original vehicle, whereby in either case the system facilitates swift windshield removal for the user.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
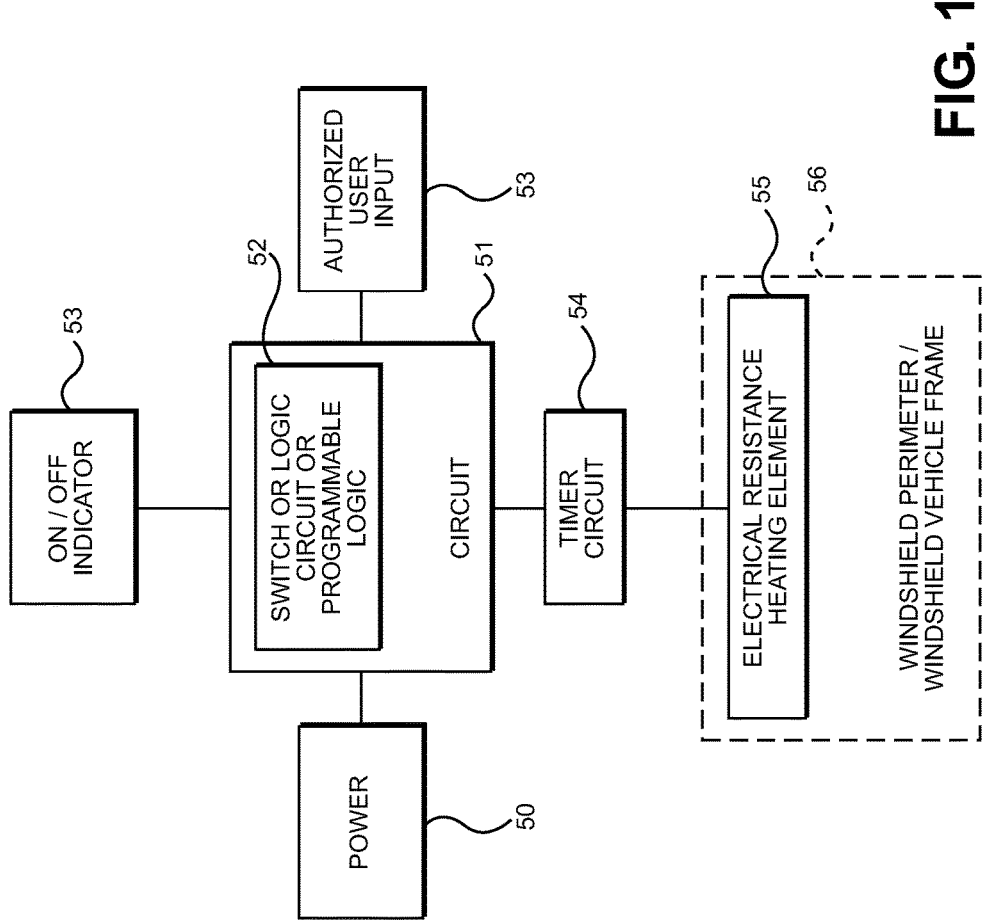
FIG. 1 shows a schematic view of the present system.

Reference is made herein to the attached drawings. Like reference numerals are used throughout the drawings to depict like or similar elements of the automotive glass removal system and method. For the purposes of presenting a brief and clear description of the present invention, the preferred embodiment will be discussed as used for removing a vehicle windshield supported by a windshield frame and secured using an epoxy adhesive. The figures are intended for representative purposes only and should not be considered to be limiting in any respect.

Referring now to FIG. 1, there is shown a schematic diagram of the automotive glass removal system of the present invention and its constituent elements. The system includes an electrical resistance heating element 55 that is deployed 56 either within the glass perimeter of an automotive window or one that is mounted along the perimeter of the window frame and secured to the vehicle. Electrical current for the resistance heating element is derived from a power source 50, which can be derived from the vehicle's battery, energy drawn from the vehicle's electrical system when running from the alternator, or alternatively from a power source outside of the vehicle. The input power is regulated by a processing means 52 within an electric circuit 51, which monitors the operation of the system, the system inputs, and communicates with the system elements. A timer circuit 54 regulates the flow of current from the battery to the heating element 55, whereby the time in which the heating element 55 is active is regulated to prevent overheating or excessive power draw. This timing feature may also be monitored by the microprocessor without the need for a separate timing circuit 54.

To initiate the device, it is contemplated that the system be controlled only by an authorized user and not a layperson or occupant of the vehicle. Notably, an authorized user input 53 allows only an authorized technician or one who is servicing the vehicle to gain access to the operational controls of the system. While it is a simple switch may be employed to operate the device in the most basic embodiment of the system, it is desired to also provide a more sophisticated system that not only provides a means of improved glass removal, but also one that can be safely deployed and operated under a controlled environment. Specifically, the present system cannot activate when the vehicle is being utilized for transportation or during normal driving activity. This would weaken the bond between the glass member (e.g. a windshield or rear window) and create a potential hazard for the occupants and nearby drivers if the glass was to liberate from the vehicle. To avoid this unnecessary risk, an authorized user input 53 is contemplated that limits operation of the device to those certified or having particular service knowledge to operate the device. The processing means of the system may also communicate with the vehicle electronic control unit (ECU) or electrical system to limit use of the present system to only those times when the vehicle engine is not running. This provides another layer of protection that prevents unwanted use of the system when operating the vehicle.

The processing means 52 of the present invention may comprise a microprocessor, a central processing unit, or a logic circuit that regulates and manages the elements of the system and their operation. This includes interpreting the user input 53, recognizing the vehicle state, indicating 53 to the user that the system is operational and the heating element is active, while also routing current from the power source 50 to the heating element 55. The electric circuit may transform or alter the electrical power 50 input to a suitable level for which the heating element is designed to accept.

Figure 2:
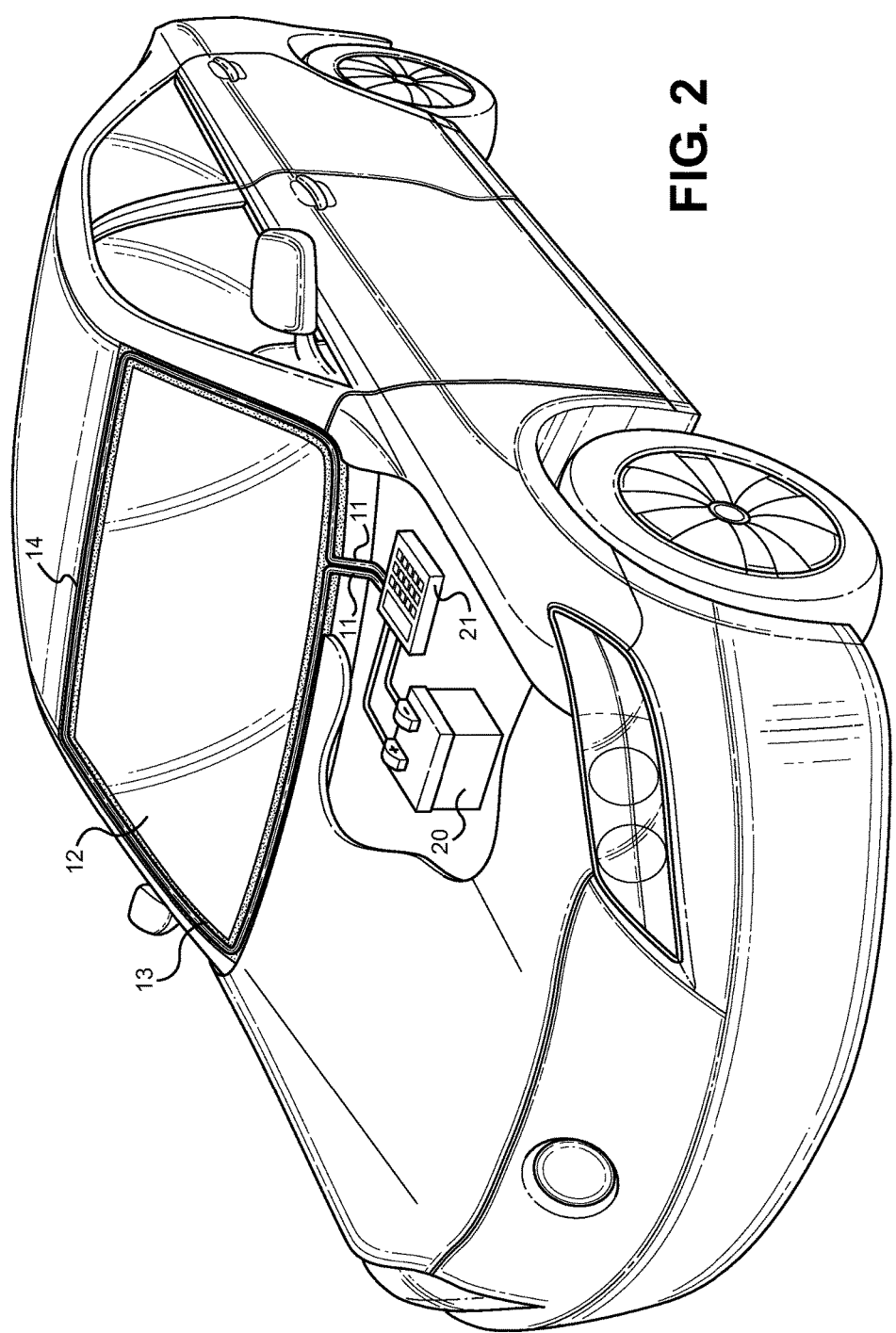
FIG. 2 shows an embodiment of the system installed in conjunction with a vehicle windshield.

Referring now to FIG. 2, there is shown a view of the present system being deployed on a passenger vehicle and in conjunction with a vehicle windshield 12. The resistance heating element 11 for the system is deployed along the bond line between the periphery 13 of the windshield 12 and the vehicle window frame. The bond line corresponds to the contact point between the glass and the frame, whereupon epoxy adhesive is utilized to secure the windshield periphery 13 to the windshield frame 14. When activated, the heating element 11 rapidly rises in temperature to soften and weaken the adhesive. It is contemplated that a thermoplastic epoxy adhesive be utilized in the conjunction with the present invention, whereupon heating the adhesive initiates a softening or melting of the adhesive material rather than a burning process, as would occur with a thermoset adhesive material. The heating element rises to its operating temperature rapidly and stays constant by way of control from the processing means and the electrical circuit. After a period of time, the timer circuit or processing means deactivates the flow of current through the heating element 11 and notifies the user that the system is not longer in operation. Once the adhesive has begun to melt, a user may force the periphery 13 of the windshield 12 away from the windshield frame 14 to separate the two and begin removal of the windshield. A prying tool or blade may be employed; however the need for a cutting operation as used in traditional removal methods is significantly reduced or completely eliminated based on the results of heating and weakening the adhesive material.

In one layout, the controls for the system are deployed within the interior of the vehicle's engine bay to prevent inadvertent initiation or access to the system by a driver or occupants. A control housing 21 is contemplated to provide an interface for user input, an interior volume for supporting the system electrical circuitry and processing means, an indicator or display screen, and also electrical connections for the power source and the heating element 11. In this layout, the power source may comprise the vehicle's battery 20 or wired connection to the vehicle electrical system for powered operation when the vehicle is running. This alternate configuration may require the vehicle to run, which may not be desirable as a safety precaution for the overall system; therefore the preferred power source is current drawn directly from the vehicle battery when the vehicle engine is not running.

When initiating a windshield 12 replacement, a technician or authorized user opens the engine compartment to reveal the control housing interface 21. He or she would input a password or code into a keyboard to unlock the system, whereafter the user can navigate the display screen and initiate the flow of electrical power from the power supply to the heating element 11 around the windshield perimeter 13. An outside power source may be utilized, depending on the design of the system. Outside power can separate the present system from the vehicle electronics to avoid electrical problems or issues with tapping into the vehicle electrical system. Outside power sources may include a cord connection to an outlet or a power supply on a trolley that is placed next to the vehicle prior to the window replacement operation. The power is connected to the system and drawn from outside the vehicle. The processing means of the system interprets the user inputs and verifies the code that unlocks the system. Once initiated, the heating element 11 rapidly reaches operating temperature and maintains that temperature for a programmed length of time, whereafter the timing circuit or processing means ceases power to the heating element 11 and notifies the user that the system operation has ceased. The user can test the periphery connection of the window with the windshield frame 14 by inserting a tool between the frame 14 and the windshield periphery 13 to start separation thereof. The tool can be run along the entire periphery 13 of the windshield 12 until the windshield 12 and the frame 14 are disconnected. The windshield 12 is then lifted away and discarded, while the remaining adhesive is removed in preparation for a fresh layer thereof for the replacement windshield.

The control housing 21 and user interface may require system elements that store information from the manufacturer and information input by the user. The pass code of the system must be stored locally and verified against user input; therefore the processing means requires memory and computer storage in the form of readable media. If the processing means is a microprocessor or central processing unit, programmed logic may also be stored on the computer storage media. The processing means includes an input terminal in the form of a keypad or keyboard, whereby typed input can be received from the user and verified against an authentication pass code stored in the system. The exact configuration of the control housing 21, the electrical circuit, and the design of the system may take several different forms and varying complexity based on end user requirements or the manufacturer of the system; however it is desired to describe a system that can accept user input and initiate the heating element within a controlled environment for automotive glass removal.

Figure 3:
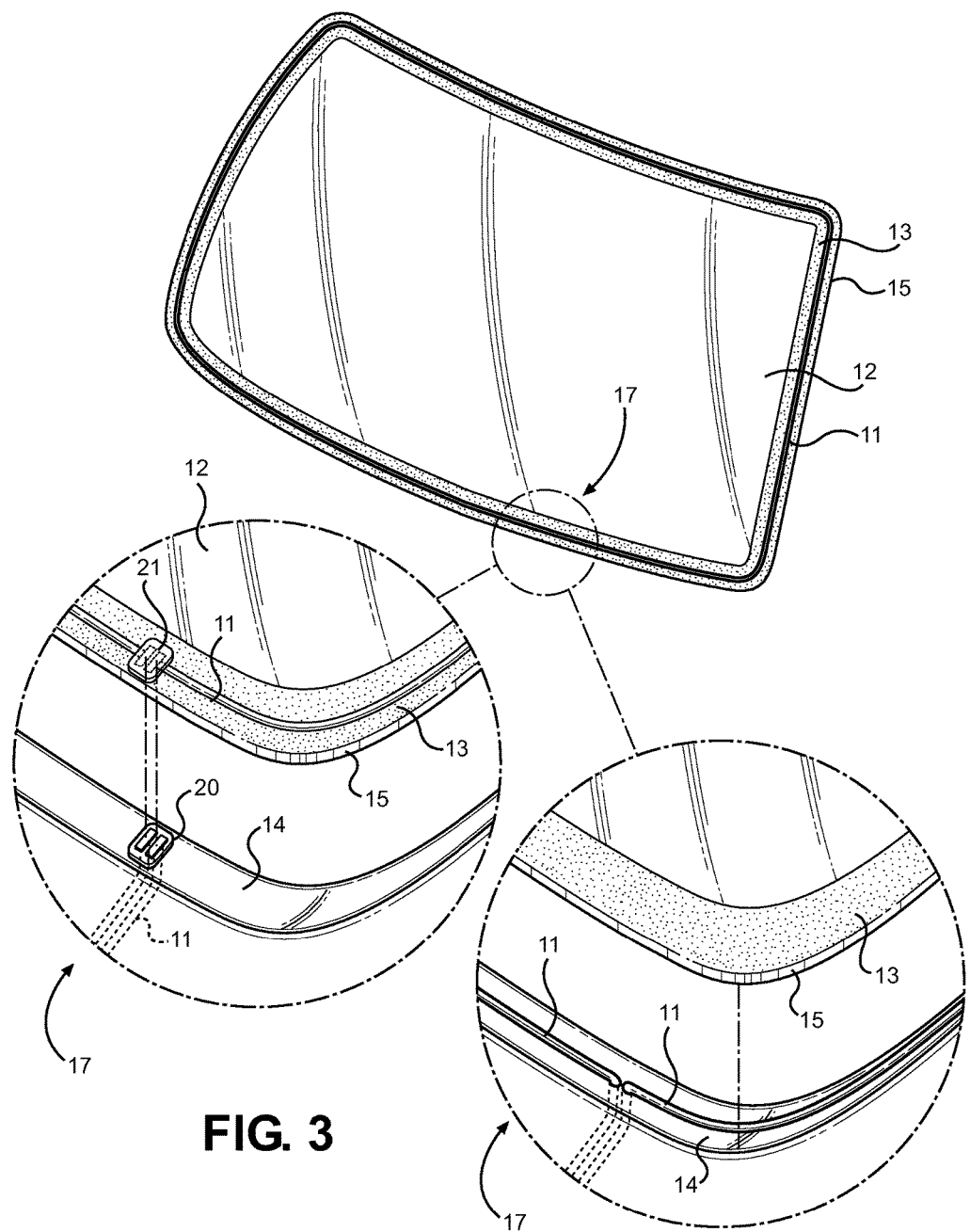
FIG. 3 shows two embodiments of the present invention, the first as imbedded within the windshield frame and the second as imbedded within the perimeter of the windshield glass.

Referring now to FIG. 3, there is shown the first and second deployment embodiments of the heating element of the present invention. The system elements of the present invention include the power source and all components necessary for directing power and managing the operation of the system between the power source and the heating element 11. These control and input components are housed within the interior of the vehicle and are accessed when necessary. The heating element, however, may be deployed in one of two ways: 1) permanently connected to the vehicle and around the window frame, and 2) positioned on the replacement glass periphery such that the heating element follows the window and disconnects from the vehicle when the window is replaced.

The first embodiment utilizes a reusable heating element 11 that is routed along the vehicle window frame 14 and accepts an unmodified or stock window thereover. The adhesive compound is spread over this heating element during installation such that removal is facilitated by direct heating of the hardened adhesive if replacement is ever necessary. The adhesive bonds the window perimeter 13 to the window frame 14, while the outer edge 15 of the window is fitted to allow a gap between an upstanding portion of the frame (the pinch weld on the windshield) such that a gasket seal can be placed therein. This gap allows a lifting tool to be inserted thereinto to initiate lifting of the window perimeter 13.

The second embodiment of the heating element deployment is placement within or along the underside of an automotive glass perimeter 13, wherein the heating element spans the perimeter and offset from the glass edge 15. The vehicle frame provides an electrical contact or connector 20 that is aligned with a corresponding contact or connector 21 along the interior surface of the window 12 such that when the window is mounted, the two contacts mate and effectuate an electrical connection therebetween. Electrical connectivity between the vehicle contact 20 and the glass contact 21 is vital to ensure the current from the vehicle power source is routed through the heating element and no short circuits are present. This embodiment also requires the glass structure to include the heating element in its design, whereby the heating element 11 is provided along the underside surface of the glass along its perimeter 13, or alternatively the heating element is embedded within its structure during manufacturing. This may raise the cost of the glass and also make sourcing a replacement window more difficult for the consumer; however it also ensures that a fresh heating element is ready for deployment. The first embodiment remains within the window frame 14 after the adhesive is removed. Over time, the removal of residual adhesive may wear on the heating element and require its replacement. With the second embodiment, a fresh heating element 11 is deployed with each window replacement. Both embodiments are herein contemplated for the present system, providing flexibility in deploying a system layout that is most suitable for the end requirements and needs of the consumer.

Figure 4:
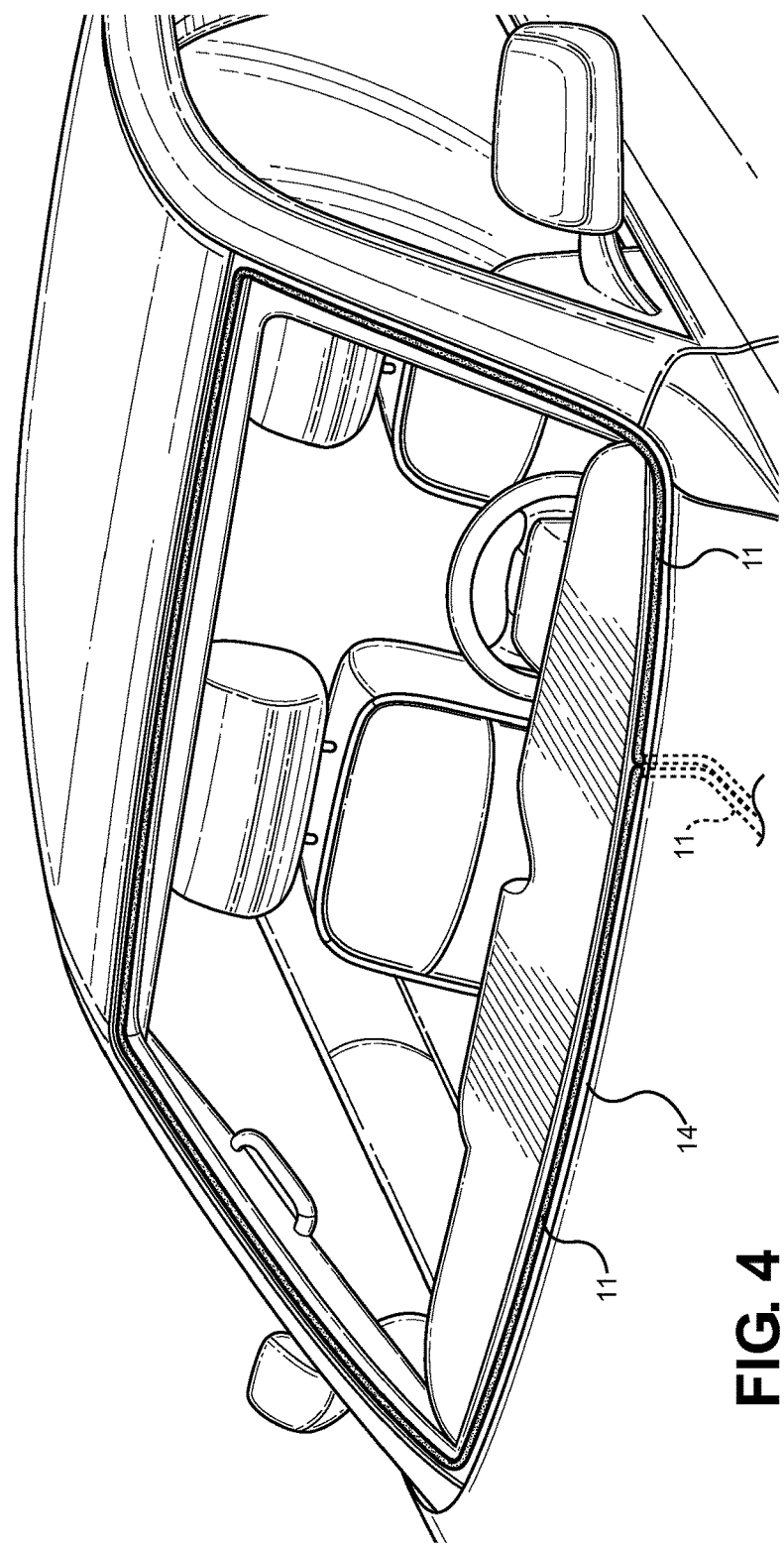
FIG. 4 shows a view of the present invention imbedded within the vehicle frame and without the automotive glass installed.

Referring now to FIG. 4, there is shown the second embodiment of the heating element deployment, wherein the heating element 11 is supported within a windshield frame 14. The element is secured to the frame 14 in a position below a later-installed windshield perimeter and offset from the windshield frame pinch weld. A layer of epoxy adhesive is deployed over the heating element using an electric caulking gun, whereafter the vehicle windshield is placed thereover and pressed into place for curing. The thickness of the heating element 11 is preferably a minimal as possible to reduce any gaps between the frame 14 and the windshield, or any pockets within the adhesive layer after installation. The frame 14 may be designed to incorporate this heating element if the present system is deployed as a factory available option, whereby a recess or channel within the window frame may accommodate the thickness of the heating element. Further still, heat conductive material may be placed along the frame 14 to assist in the heating process, distributing heat uniformly across the adhesive bond to improve thorough heat penetration and equal weakening thereof.

Auto body and glass repair shops remove windshields every day, yet this fairly routine repair can cause many problems using the traditional glass removal operation of scoring and cutting the bonding adhesive between the glass perimeter and the glass frame. The traditional process can take considerable amount of time and manpower to separate the glass from the vehicle. If it is not done correctly, the exterior of the vehicle could end up burned, dented, or scratched, while the dashboard area or interior trim and upholstery could also be cut and scratched during the removal process. Technicians removing the glass can also easily become injured in the traditional process, as the use of a cutting tool and considerable input thereon can result in slippages that result in cuts or other injury. The present invention contemplates a new method of automotive glass removal, wherein a heating element along the perimeter of the glass and in proximity to the bond line with the vehicle is used to heat and weaken the bonding material. A technician can then lift and separate the window perimeter from the window frame using outward pressure on the glass or by prying the edge of the window away from the frame using a prying tool. In this way, the bonding material is not removed using a cutting operation, but rather a heating and prying operation that does not introduce a significant chance of window shattering or injury to the user.

The presented system elements are herein disclosed for the purposes of heating a bond line between an automotive glass member and its supporting frame on the vehicle. Several different embodiments of the system and its deployment are contemplated, including who has access to the system and when it can be initiated, its specific electrical components, the power source, and the layout of the heating element. It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of removing vehicle glass from a vehicle window frame, comprising the steps of:
    deploying an electrical heating element along an entire bond line between a perimeter of a vehicle glass and a perimeter of its supporting vehicle window frame;
    inputting an authorized user input into a control housing interface operably connected to said electrical heating element;

activating said heating element via the control housing interface to weaken an adhesive along said entire bond line;

separating said vehicle glass from said vehicle window frame until said vehicle glass is completely separated therefrom.

2. The method of claim 1, further comprising the steps of:

monitoring a vehicle state to determine whether a safe condition is present prior to activation of said heating element.

3. The method of claim 1, further comprising the steps of:

utilizing said vehicle glass having a mateable electrical contact and said heating element connected to said vehicle glass such that said heating element remains connected to said vehicle glass during replacement of said vehicle glass.

4. The method of claim 1, further comprising the steps of:

utilizing said heating element that is positioned along said vehicle frame, whereby said heating element remains connected to said vehicle frame during replacement of said vehicle glass.

5. The method of claim 1, further comprising the steps of:

maintaining said heating element at a constant temperature via a microprocessor operably connected to said control housing interface;

deactivating said heating element automatically via said microprocessor after a predetermined period of time;

sending a notification to a user that said heating element is no longer activated.

6. The method of claim 1, further comprising the step of:

replacing said vehicle glass with a replacement glass, wherein said replacement glass includes a replacement heating element disposed along a bond line between said replacement glass and said supporting vehicle window frame.

7. A method of removing vehicle glass from a vehicle window frame, comprising the steps of:

deploying an electrical heating element along an entire bond line between a perimeter of a vehicle glass and a perimeter of its supporting vehicle window frame;

inputting an authorization code onto a keypad that is disposed on a control housing interface operably connected to said electrical heating element;

activating said heating element via the control housing interface to weaken an adhesive along said entire bond line;

separating said glass from said window frame until said glass is completely separated therefrom.

* * * * *